(12) United States Patent
Woo et al.

(10) Patent No.: US 12,307,711 B2
(45) Date of Patent: May 20, 2025

(54) SERVER AND CONTROL METHOD THEREOF

(71) Applicants: HYUNDAI MOTOR COMPANY, Seoul (KR); KIA CORPORATION, Seoul (KR)

(72) Inventors: Seunghyun Woo, Seoul (KR); Jae Yul Woo, Seoul (KR); Rowoon An, Seoul (KR); Soobin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 35 days.

(21) Appl. No.: 17/975,817

(22) Filed: Oct. 28, 2022

(65) Prior Publication Data

US 2023/0186515 A1 Jun. 15, 2023

(30) Foreign Application Priority Data

Dec. 15, 2021 (KR) .................. 10-2021-0179348

(51) Int. Cl.
*G06T 7/73* (2017.01)
(52) U.S. Cl.
CPC ............ *G06T 7/74* (2017.01); *G06T 2200/24* (2013.01)
(58) Field of Classification Search
CPC .............................. G06T 7/74; G06T 2200/24
See application file for complete search history.

(56) References Cited

U.S. PATENT DOCUMENTS

| | | | |
|---|---|---|---|
| 10,641,612 B2 * | 5/2020 | Sagall | G01C 21/20 |
| 10,885,714 B2 | 1/2021 | Finman et al. | |
| 10,921,131 B1 * | 2/2021 | Cruz | H04W 4/024 |
| 11,168,990 B2 * | 11/2021 | Ozog | G06F 16/235 |
| 2011/0313779 A1 * | 12/2011 | Herzog | G06Q 30/02 715/744 |
| 2015/0019121 A1 * | 1/2015 | Gao | G01C 21/206 345/630 |
| 2015/0133152 A1 * | 5/2015 | Edge | G01S 5/0036 455/456.1 |
| 2015/0331890 A1 * | 11/2015 | Har-Noy | G06F 16/29 707/722 |
| 2019/0050901 A1 * | 2/2019 | Vincent | H04W 4/21 |
| 2020/0004777 A1 | 1/2020 | Filgueiras De Araujo et al. | |
| 2020/0302510 A1 | 9/2020 | Chachek et al. | |
| 2021/0287440 A1 | 9/2021 | Wang et al. | |

FOREIGN PATENT DOCUMENTS

KR    10-1898075 B1    9/2018

* cited by examiner

*Primary Examiner* — Sherrod L Keaton
(74) *Attorney, Agent, or Firm* — Morgan, Lewis & Bockius LLP

(57) ABSTRACT

A server includes a communicator; and a controller configured to: when an image data is received from a terminal device through the communicator, determine a first key point of the image data and a first descriptor corresponding to the first key point, determine a location of the terminal device by comparing the first descriptor with a second descriptor stored in a virtual positioning system (VPS) map, determine an area where a difference between the first descriptor and the second descriptor is greater than or equal to a predetermined value based on the location of the terminal device, and update a key point of the area on the VPS map and the second descriptor based on the image data, or request crowdsourcing of an image data about the area.

17 Claims, 13 Drawing Sheets

FIG. 9

| Warren Admin | | | | | | | HYUNDAI LOG-OUT |
|---|---|---|---|---|---|---|---|
| SERVICE STATE | REQUEST FOR SOURCING | | | | | | |
| INDOOR SPOT | | | | | | | |
| INDOOR PATH GUIDE | | | | 940 | | 950 | |
| VPAS APP MANAGEMENT | | SEARCH FOR SPOT NAME... | STATE : | ALL ▼ | SEARCH | | + REQUEST FOR NEW SOURCING |
| APP UPDATE | | | | 930 | 940 | | |
| SOURCING AND REWARD | | AREA | TARGET SPOT | NAME | REQUEST DATE | REQUEST NUMBER | UPLOADED FILE | STATE |
| POWER MANAGEMENT | | COEX | STARBUCKS | HOLLYS COFFEE COEX BRANCH | 2021/5/10 | 210205100810 | 2 (REWARD PROVIDED 0/2) | IN PROGRESS | REQUEST ENDED |
| APP USER | 950 | COEX | BON-JOOK | JOOK-STORY COEX BRANCH | 2021/5/4 | 210205040800 | 0 | IN PROGRESS |
| APP MANAGER | | COEX | DE KONING | D-QUEENS COEX BRANCH | 2021/5/4 | 210205040800 | 5 (REWARD PROVIDED 3/5) | END | REQUEST ENDED |

223

SERVER AND CONTROL METHOD THEREOF

CROSS-REFERENCE TO RELATED APPLICATION

The present application claims priority to Korean Patent Application No. 10-2021-0179348, filed on Dec. 15, 2021, the entire contents of which is incorporated herein for all purposes by this reference.

BACKGROUND OF THE PRESENT DISCLOSURE

Field of the Present Disclosure

The present disclosure relates to a server and a control method thereof that provides a virtual positioning system (VPS) map.

Description of Related Art

Recently, the number of services that provide a virtual positioning system (VPS) map using a point cloud is increasing, and users may be provided with augmented reality (AR) route guidance based on the user's position by use of the service.

However, when geographical features are changed in a space corresponding to a VPS map, an accuracy of service may be reduced, and thus the VPS map is required to be updated by reflecting the change.

Accordingly, even after construction of VPS map, the VPS map is required to be managed and updated. However, updates may not be easily made due to cost and time constraints, which leads to deterioration of accuracy of the VPS map and user dissatisfaction.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a server and a control method thereof that update a virtual positioning system (VPS) map through crowdsourcing, thereby may reduce a cost for managing and correcting the VPS map and improve an accuracy of the VPS map.

Additional aspects of the present disclosure will be set forth in part in the description which follows, and in part, will be obvious from the description, or may be learned by practice of the present disclosure.

According to an exemplary embodiment of the present disclosure, there is provided a server including: a communicator; and a controller configured to: when an image data is received from a terminal device through the communicator, determine a first key point of the image data and a first descriptor corresponding to the first key point, determine a location of the terminal device by comparing the first descriptor with a second descriptor stored in a virtual positioning system (VPS) map, determine an area where a difference between the first descriptor and the second descriptor is greater than or equal to a predetermined value based on the location of the terminal device, and update a key point of the area on the VPS map and the second descriptor based on the image data, or request crowdsourcing of an image data about the area.

When the image data about the area is received, the controller is configured to update the key point of the area on the VPS map and the second descriptor based on the image data about the area.

The controller is configured to provide a reward to a terminal device that transmits the image data about the area.

The controller is configured to control the communicator to transmit a message that confirms the update of the key point of the area and the second descriptor, to the terminal device that transmits the image data about the area.

A request signal for requesting the crowdsourcing includes at least one of a location information of the area, a photographing guide information for obtaining the image data, or an augmented reality (AR) icon information for guiding a location of the area.

The server further includes a user interface including a display module and an input module.

When the area where the difference between the first descriptor and the second descriptor is greater than or equal to a predetermined reconstruction reference value based on the location of the terminal device is identified, the controller is configured to control the user interface to guide a necessity for reconstruction of the VPS map for the area, and request crowdsourcing for the area based on a user input.

When a plurality of areas identified exist, the controller is configured to control the user interface to display a list of the plurality of areas in an order of greatest difference between the first descriptor and the second descriptor.

When a crowdsourcing information about an area that requires crowdsourcing is input, the controller is configured to request crowdsourcing for the area that requires the crowdsourcing, the crowdsourcing information including at least one of a name, a location or a reward information of the area that requires the crowdsourcing.

The controller is configured to control the user interface to display the crowdsourcing information about the area.

The controller is configured to control the user interface to display information about an area located within a predetermined distance based on the location of the terminal device.

When at least one of generation, correction, or deletion of information about an area is input, the controller is configured to request crowdsourcing for the area about which the at least one of the generation, the correction, or the deletion of information is input.

The controller is configured to control the user interface to display a crowdsourcing state information about each of areas where crowdsourcing is requested, as a list, the crowdsourcing state information including information about at least one of whether the image data is uploaded or a degree of update progress.

The controller is configured to stop requesting crowdsourcing for the area, when an end command for crowdsourcing is received.

According to an exemplary embodiment of the present disclosure, there is provided a method of controlling a server including a communicator, the control method including: when an image data is received from a terminal device through the communicator, determining a first key point of the image data and a first descriptor corresponding to the first key point; determining a location of the terminal device by comparing the first descriptor with a second descriptor stored in a VPS map; determining an area where a difference between the first descriptor and the second descriptor is greater than or equal to a predetermined value based on the location of the terminal device; and updating a key point of the area on the VPS map and the second descriptor based on the image data, or requesting crowdsourcing of an image data about the area.

The method of controlling the server may further include when the image data about the area is received, updating the key point of the area on the VPS map and the second descriptor based on the image data about the area.

The method of controlling the server may further include providing a reward to a terminal device that transmits the image data about the area.

The method of controlling the server may further include controlling the communicator to transmit a message that confirms the update of the key point of the area and the second descriptor, to a terminal device that transmits the image data about the area.

A request signal for requesting the crowdsourcing includes at least one of a location information of the area, a photographing guide information for obtaining image data, or an AR icon information for guiding a location of the area.

The server further includes a user interface including a display module and an input module.

When the area where the difference between the first descriptor and the second descriptor is greater than or equal to a predetermined reconstruction reference value based on the location of the terminal device is identified, the requesting of crowdsourcing includes controlling the user interface to guide a necessity for reconstruction of the VPS map for the area, and requesting crowdsourcing for the area based on a user input.

When a plurality of areas identified exist, the method of controlling the server further includes controlling the user interface to display a list of the plurality of areas in an order of greatest difference between the first descriptor and the second descriptor.

When crowdsourcing information about an area that requires crowdsourcing is input, the requesting of crowdsourcing includes requesting crowdsourcing for the area, the crowdsourcing information including at least one of a name, a location or reward information of the area.

The method of controlling the server further includes controlling the user interface to display the crowdsourcing information about the area.

The method of controlling the server further includes controlling the user interface to display information about an area located within a predetermined distance based on the location of the terminal device.

When at least one of generation, correction, or deletion of information about an area is input, the requesting of crowdsourcing includes requesting crowdsourcing for the area.

The method of controlling the server further includes controlling the user interface to display crowdsourcing state information about each of areas where crowdsourcing is requested, as a list, the crowdsourcing state information including information about at least one of whether the image data is uploaded or a degree of update progress.

The method of controlling the server further includes stopping requesting crowdsourcing for the area, when an end command for crowdsourcing is received.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 9 illustrates an example a server displays a crowdsourcing request list according to an exemplary embodiment of the present disclosure.

Figure 1:
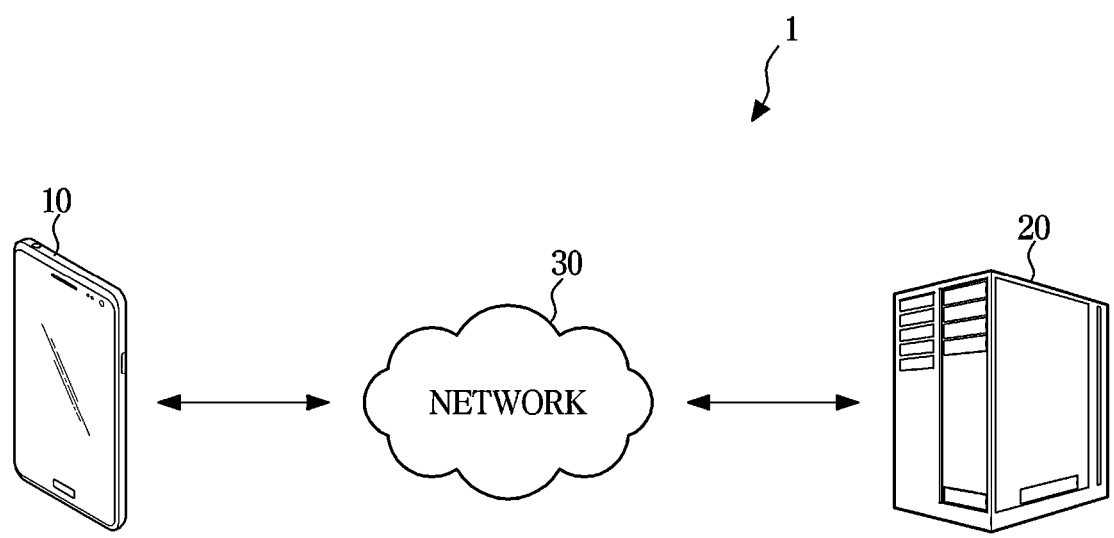
FIG. 1 illustrates a crowdsourcing system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals throughout the specification denote like elements. Also, the present specification does not describe all the elements according to various exemplary embodiments of the present disclosure, and descriptions well-known in the art to which the present disclosure pertains or overlapped portions are omitted.

It will be understood that when an element is referred to as being "connected" to another element, it may be directly or indirectly connected to the other element, wherein the indirect connection includes "connection" via a wireless communication network.

It will be understood that the term "include" when used in the exemplary embodiment, specifies the presence of stated features, integers, steps, operations, elements, and/or components, but do not preclude the presence or addition of one or more other features, integers, steps, operations, elements, components, and/or groups thereof.

It is to be understood that the singular forms are intended to include the plural forms as well, unless the context clearly dictates otherwise.

The terms such as "~part", "~device", "~block", "~member", "~module", and the like may refer to a unit of processing at least one function or act. For example, the terms may refer to at least one process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, embodiments of a server and a control method thereof according to an aspect of the present disclosure will be described in detail with reference to the accompanying drawings.

FIG. 1 illustrates a crowdsourcing system according to an exemplary embodiment of the present disclosure.

Referring to FIG. 1, according to an exemplary embodiment of the present disclosure, a crowdsourcing system 1 includes a terminal device 10, a server 20 and a network 30. The terminal device 10 may obtain image data by including a camera. The server 20 may update a virtual positioning system (VPS) map by requesting the terminal device 10 for crowdsourcing. The network 30 supports communication between the terminal device 10 and the server 20.

As shown in FIG. 1, the terminal device 10 according to various exemplary embodiments of the present disclosure may correspond to a user terminal, and transmit the image data obtained through the camera to the server 20. The user terminal may transmit the image data to the server 20 to be provided with an augmented reality (AR) service, and also transmit the image data to the server 20 in response to a crowdsourcing request from the server 20.

Also, contrary to that shown in FIG. 1, the terminal device 10 may correspond to digital signage provided in a space corresponding to the VPS map, and transmit the image data obtained through the camera to the server 20.

According to an exemplary embodiment of the present disclosure, the server 20 may provide an AR route guidance service based on the VPS map constructed by point clouds.

For example, the server 20 may extract a key point (hereinafter, "first key point") by processing the image data received from the terminal device 10, and determine a descriptor (hereinafter, "first descriptor") corresponding to the extracted key point. The server 20 may compare the determined first descriptor with a descriptor (hereinafter, "second descriptor") stored in the VPS map, thereby may identify a key point (hereinafter, "second descriptor") on the VPS map corresponding to the first key point included in the image data. Through the above, the server 20 may identify a location of the terminal device 10 on the VPS map. As described above, the server 20 may identify the location of the terminal device 10 in real time and provide a guide to a destination.

Here, the descriptor may correspond to a data structure for recording a property of key point of image data, and describe information about a key point in a vector form by including an angle, a pose, and the like, of the key point. Accordingly, a descriptor corresponding to a single key point may indicate a unique characteristic of the key point, and a corresponding key point may be identified through matching of descriptor. To the present end, the descriptor may have an ability to distinguish key points different from each other, and invariance which is not changed by rotation reduction, or transformation of image data. For example, the descriptor may be a scale invariant feature transform (SIFT), histogram of oriented gradient (HOG), and a binary descriptor (BRIEF, ORB, BRISK), without being limited thereto. That is, a descriptor may be applied without limitation, as long as it is a known type of descriptor.

Furthermore, according to an exemplary embodiment of the present disclosure, the server 20 may compare the first descriptor, determined based on the image data received from the terminal device 10, with the second descriptor stored in the VPS map, and when an area where a difference between the first descriptor and the second descriptor is greater than or equal to a predetermined value is identified, update a VPS map of the area.

When the area where the difference between the first descriptor and the second descriptor is greater than or equal to the predetermined value is identified, the server 20 may update the second key point corresponding to the corresponding area on the VPS map and the second descriptor, based on the image data received from the terminal device 10, or may request crowdsourcing of image data about the corresponding area.

When the terminal device 10 that transmits the image data about the corresponding area exists in response to the request for crowdsourcing, the server 20 may provide a reward to the corresponding terminal device 10, and also update the second key point corresponding to the corresponding area on the VPS map and the second descriptor.

According to an exemplary embodiment of the present disclosure, the network 30 may be connected to the terminal device 10 and the server 20 by wire or wirelessly, and support communication between the terminal device 10 and the server 20. To the present end, the network 30 may be a known type of network.

The crowdsourcing system 1 has been described above. Hereinafter, the server 20 performing crowdsourcing is described in greater detail.

Figure 2:
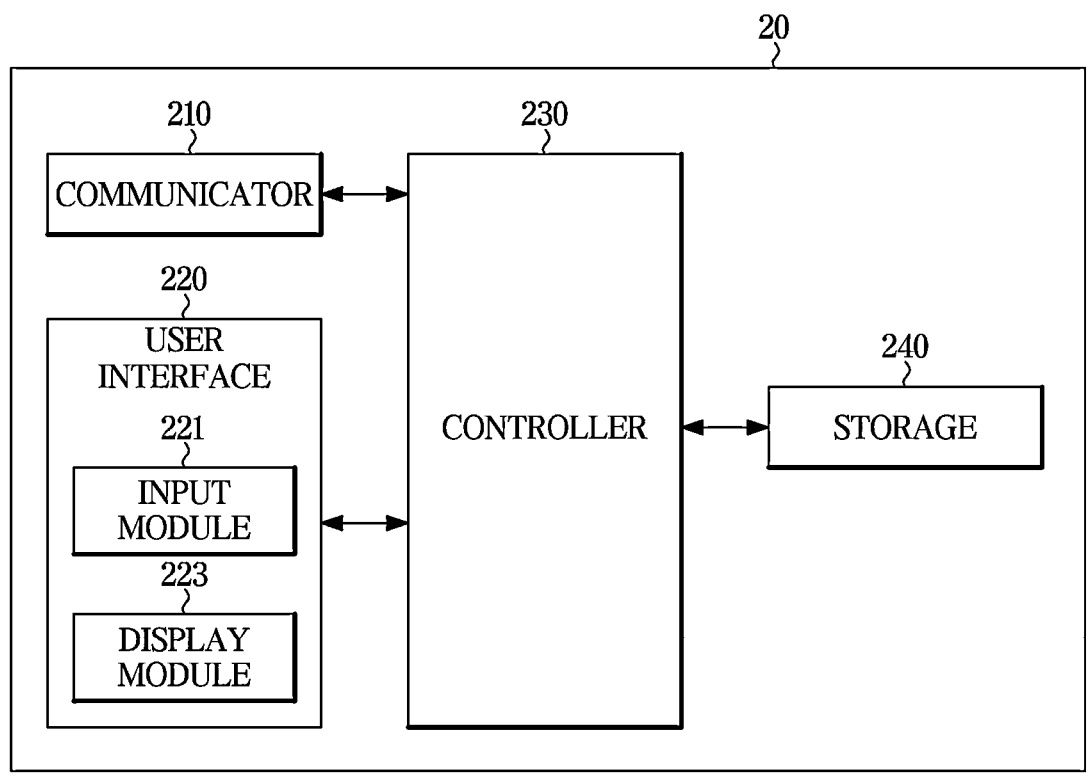
FIG. 2 is a control block diagram illustrating a server according to an exemplary embodiment of the present disclosure.

FIG. 2 is a control block diagram illustrating the server 20 according to an exemplary embodiment of the present disclosure.

Referring to FIG. 2, the server 20 according to an exemplary embodiment of the present disclosure includes a communicator 210, a user interface 220, a controller 230 and a storage 240. The communicator 210 performs communication with the terminal device 10 via the network 30, and the user interface 220 displays various information and receives user input. The controller 230 determines whether to update a VPS map based on image data received from the terminal device 10, and performs crowdsourcing for the update of the VPS map. The storage 240 stores various information required for controlling the VPS map, etc.

According to an exemplary embodiment of the present disclosure, the communicator 210 is connected to the network 30 by wire or wirelessly to transmit and receive data with the terminal device 10. To the present end, the communicator 210 may be provided as a known type of communication module.

According to an exemplary embodiment of the present disclosure, the user interface 220 may include an input module 221 capable of receiving an input from a user (administrator) of the server 20, and a display module 223 that displays various information. The input module 221 may be applied without limitation, as long as it is a known type of input device. Also, the input module 221 may be provided as a touch screen provided integrally with the display module 223. The display module 223 may be provided as a known type of display panel.

According to an exemplary embodiment of the present disclosure, when image data photographed is received from the terminal device 10 through the communicator 210, the controller 230 may determine a first key point of the image data and a first descriptor corresponding to the first key point. That is, the controller 230 may extract the first key point through image processing of the image data, and determine the first descriptor corresponding to the first key point. In the present instance, the key point may refer to a point which may specify a shape of an object, such as an edge portion of the object. The controller 230 may compare the first descriptor, determined based on the image data received from the terminal device 10, with a second descriptor stored in the VPS map, thereby may determine a location of the terminal device 10. The controller 230 may identify the second descriptor that matches the first descriptor, and determine the location of the terminal device 10 based on a location of a key point on the VPS map corresponding to the second descriptor.

The controller 230 may determine an area where a difference between the first descriptor and the second descriptor is greater than or equal to a predetermined value, based on the location of the terminal device 10. That is, by comparing the descriptors, the controller 230 may determine an area which is different from the image data received from the terminal device 10 on the previously stored VPS map.

The controller 230 may update the second key point of the area on the VPS map and the second descriptor based on the image data received from the terminal device 10, or may request crowdsourcing of image data about the area.

When an area where the difference between the first descriptor and the second descriptor is greater than or equal to the predetermined value and less than a predetermined reconstruction reference value is identified, the controller 230 may update the second key point and the second descriptor of the corresponding area based on query data of the image data itself received for location determination of the terminal device 10, thereby may update the VPS map.

Furthermore, when an area where the difference between the first descriptor and the second descriptor is greater than or equal to the predetermined reconstruction reference value is identified, the controller 230 may request crowdsourcing of image data about the area, and update a second key point and a second descriptor of the corresponding area based on image data of the area received in response to the request for crowdsourcing, thereby may update the VPS map. In the instant case, the controller 230 may provide the terminal device 10 that participated in the crowdsourcing with a reward (e.g., a point, money, coin, cash, certification, ranking, etc.). Furthermore, according to various exemplary embodiments of the present disclosure, the controller 230 may control the communicator 210 to transmit a message that confirms the update of the key point of the area and the second descriptor, to the terminal device 10 that transmits the image data of the area. That is, according to various exemplary embodiments of the present disclosure, the controller 230 may provide the terminal device 10 that participated in the crowdsourcing with a feedback about the update of the VPS map.

In the present instance, a request signal for requesting crowdsourcing may include at least one of location information of area, photographing guide information for obtaining image data, or AR icon information for location guidance of area. Through the above, the terminal device 10 that receives the request signal for requesting crowdsourcing may identify a location of an area that requires crowdsourcing of the image data, and also display a guide to photographing for obtaining the image data and a route guidance to the corresponding area through an AR icon.

Furthermore, according to various exemplary embodiments of the present disclosure, when the difference between the first descriptor and the second descriptor is greater than or equal to the predetermined reconstruction reference value, the controller 230 may control the user interface 220 to guide a necessity for reconstruction of the VPS map for the area, and request crowdsourcing for the area based on a user input.

In the present instance, when a plurality of areas where the difference between the first descriptor and the second descriptor is greater than or equal to the predetermined reconstruction reference value exist, the controller 230 may control the user interface 220 to display a list of the plurality of areas in an order of greatest difference between the first descriptor and the second descriptor, and request crowdsourcing for an area selected by a user.

For example, when crowdsourcing information about an area that requires crowdsourcing is input, the controller 230 may request crowdsourcing for the corresponding area. Here, the crowdsourcing information includes at least one of a name, location or reward information of the area.

Furthermore, when at least one of generation, correction, or deletion of information about the area is input, the controller 230 may request crowdsourcing for the area.

According to an exemplary embodiment of the present disclosure, when an end command for crowdsourcing is input, the controller 230 may stop requesting crowdsourcing for the corresponding area.

According to an exemplary embodiment of the present disclosure, the controller 230 may control the user interface 220 to display the crowdsourcing information about the area.

According to an exemplary embodiment of the present disclosure, the controller 230 may control the user interface 220 to display crowdsourcing state information about each of areas where crowdsourcing is requested, as a list. Here, the crowdsourcing state information includes at least one of whether image data is uploaded or a degree of update progress.

According to an exemplary embodiment of the present disclosure, the controller 230 may control the user interface 220 to display information about an area located within a predetermined distance based on the location of the terminal device 10.

The controller 230 may include at least one memory storing a program for performing the aforementioned operations and operations described below, and at least one processor for implementing a stored program. When a plurality of memories and processors are provided, the plurality of memories and processors may be integrated into one chip, or provided in physically separated locations.

According to an exemplary embodiment of the present disclosure, the storage 240 may store various information required for route guidance. For example, the storage 240 may include map information for route guidance, and include a VPS map constructed based on point clouds.

The VPS map may correspond to map information including point clouds indicating a form of a road and point clouds indicating a shape of an object (e.g., a building, traffic light, tree, sign, etc.) around a road. In the present instance, the point cloud may be generated by extracting a key point from detection data obtained through a scanning device (e.g., a 360-degree image sensor, etc.) and forming a group of the extracted key points.

To the present end, the storage 240 may be provided as a known type of storage medium.

Each constituent components of the server 20 has been described above. Hereinafter, it is described in detail that the server 20 requests crowdsourcing to update a VPS map.

Figure 3:
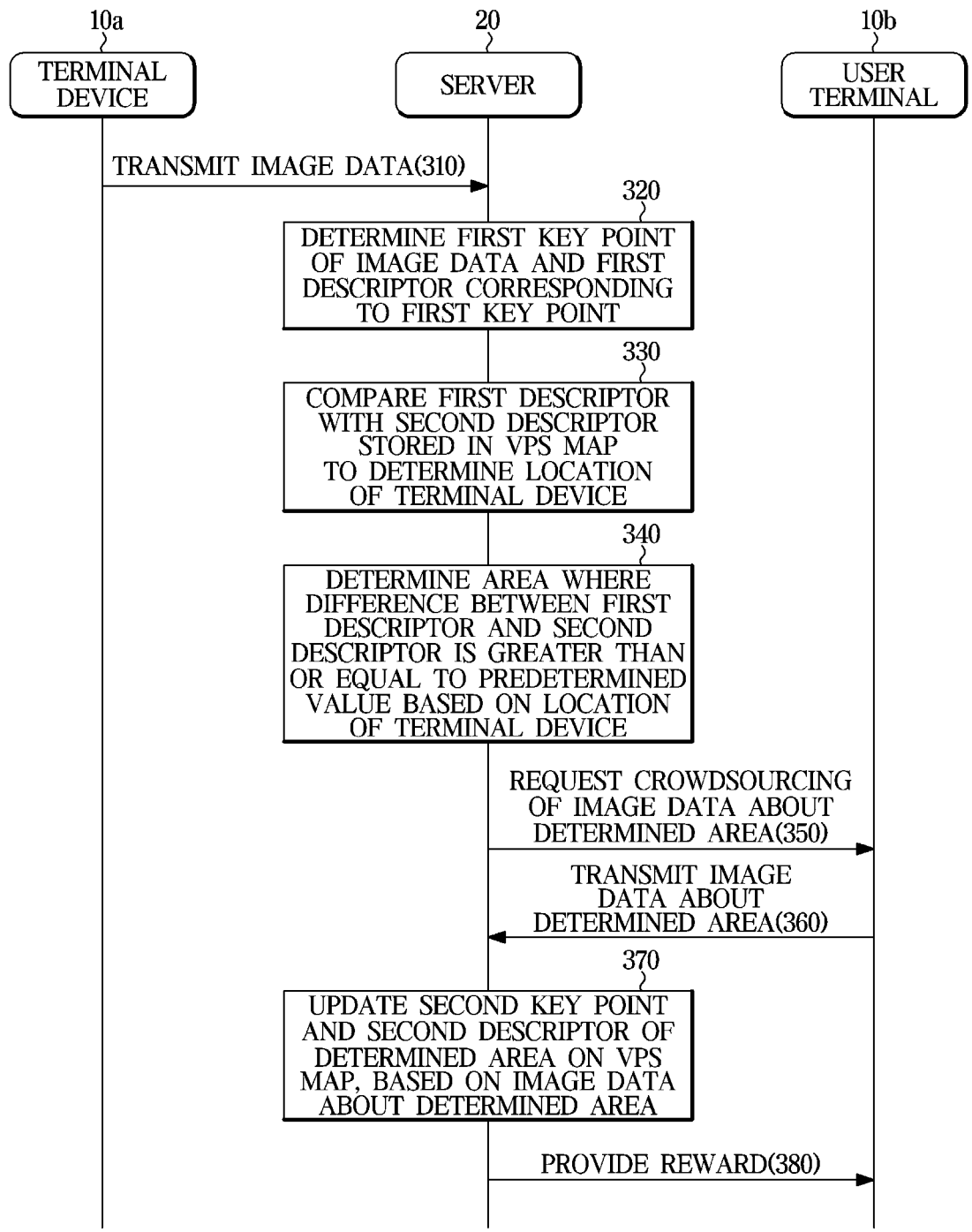
FIG. 3 is a signal flow graph when a server updates a key point and a descriptor of a point of interest (POI) through crowdsourcing according to an exemplary embodiment of the present disclosure.
Figure 4:
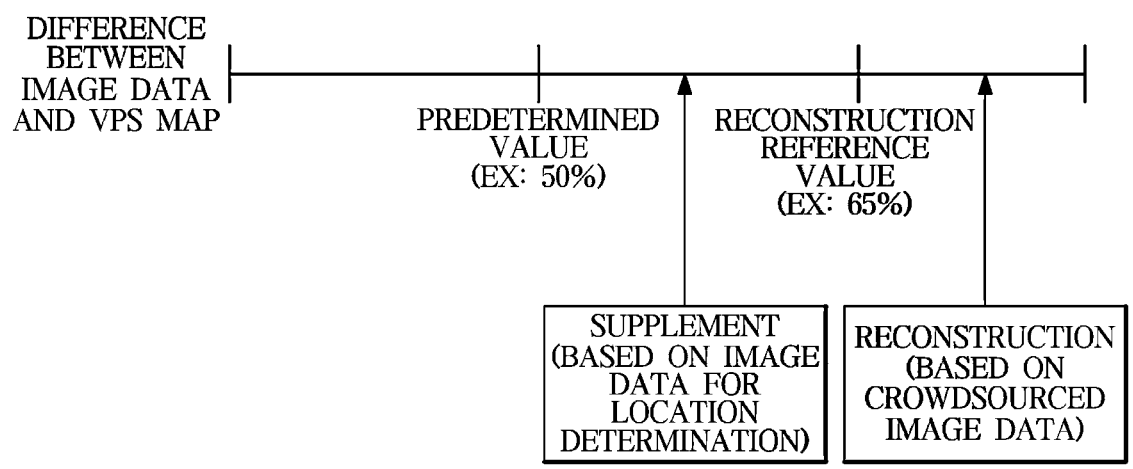
FIG. 4 is a diagram illustrating an example where a server supplements or reconstructs a virtual positioning system (VPS) map according to an exemplary embodiment of the present disclosure.
Figure 5:
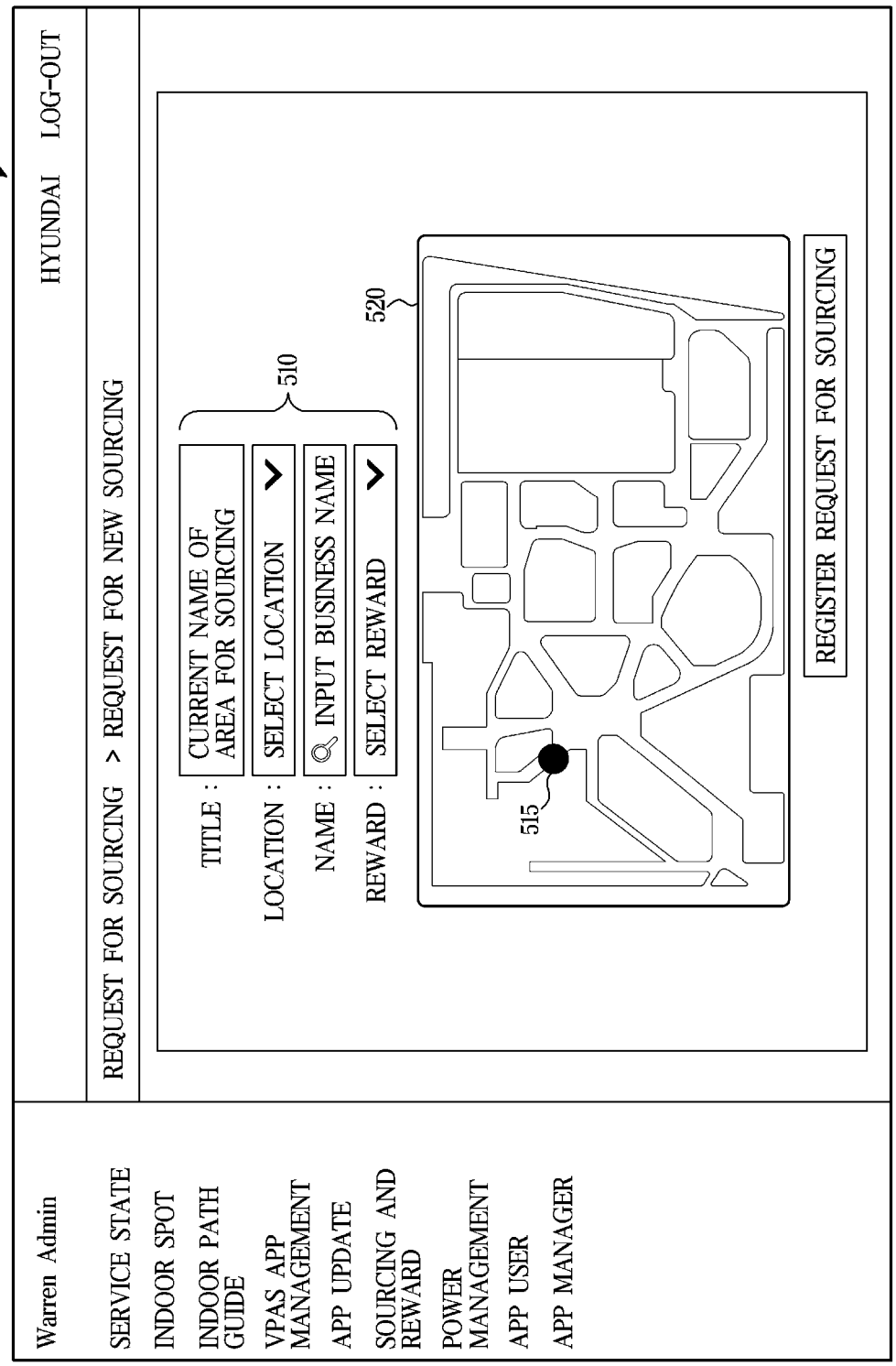
FIG. 5 illustrates an example where a server displays an interface for user input for reconstruction of a VPS map according to an exemplary embodiment of the present disclosure.
Figure 6:
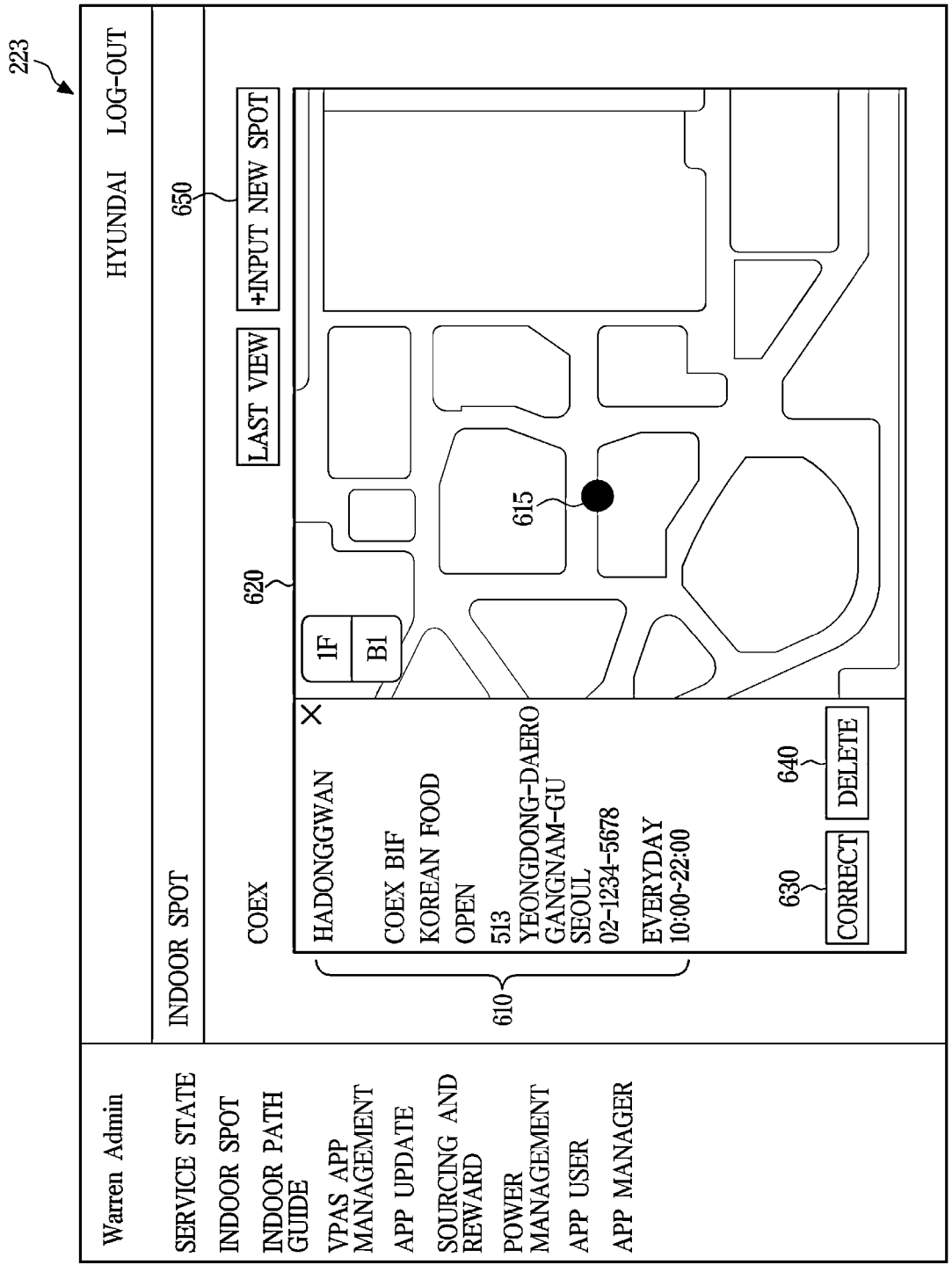
FIG. 6 illustrates an example where a server displays POI information according to an exemplary embodiment of the present disclosure.

FIG. 3 is a signal flow graph when a server updates a key point and a descriptor of a point of interest (POI) through crowdsourcing according to an exemplary embodiment of the present disclosure. FIG. 4 is a diagram illustrating an example where a server supplements or reconstructs a VPS map according to an exemplary embodiment of the present disclosure. FIG. 5 illustrates an example where a server displays an interface for user input for reconstruction of a VPS map according to an exemplary embodiment of the present disclosure. FIG. 6 illustrates an example where a server displays POI information according to an exemplary embodiment of the present disclosure. FIG. 7A, FIG. 7B, FIG. 7C and FIG. 7D illustrate examples where a terminal device participates in crowdsourcing according to an exemplary embodiment of the present disclosure.

Referring to FIG. 3, a terminal device 10*a* according to various exemplary embodiments of the present disclosure may transmit image data, photographed through a camera of the terminal device 10*a*, to the server 20 (310). The terminal device 10*a* may correspond to a user terminal to be provided with a route guidance service from the server 20, or digital signage provided in a space corresponding to a VPS map.

According to an exemplary embodiment of the present disclosure, the server 20 may determine a first key point of the image data, and a first descriptor corresponding to the first key point (320). When receiving the image data photographed from the terminal device 10*a* through the communicator 210, the server 20 may determine the first key point of the image data and the first descriptor corresponding to the first key point. In other words, the server 20 may extract the first key point through image processing of the image data and determine the first descriptor corresponding to the first key point. In the present instance, the key point may refer to a point which may specify a shape of an object, such as an edge portion of the object.

Also, the descriptor may correspond to a data structure for recording a property of key point of image data, and describe information about a key point in a vector form by including an angle, a pose, and the like, of the key point. Accordingly, a descriptor corresponding to a single key point may indicate a unique characteristic of the key point, and a corresponding key point may be identified through matching of descriptor. To the present end, the descriptor may have an ability to distinguish key points different from each other, and invariance which is not changed by rotation reduction, or transformation of image data. For example, the descriptor may be a scale invariant feature transform (SIFT), histogram of oriented gradient (HOG), and a binary descriptor (BRIEF, ORB, BRISK), without being limited thereto. That is, a descriptor may be applied without limitation, as long as it is a known type of descriptor.

According to an exemplary embodiment of the present disclosure, the server 20 may compare the first descriptor with a second descriptor stored in the VPS map, thereby may determine a location of the terminal device 10*a* (330). The server 20 may identify the second descriptor that matches the first descriptor, and determine the location of the terminal device 10*a* based on a location of a key point on the VPS map corresponding to the second descriptor.

According to an exemplary embodiment of the present disclosure, the server 20 may determine an area where a difference between the first descriptor and the second descriptor is greater than or equal to a predetermined value, based on the location of the terminal device 10*a* (340). That is, by comparing the descriptors, the server 20 may determine an area which is different from the image data received from the terminal device 10*a* on the previously stored VPS map.

The server 20 may update a second key point of the area on the VPS map and the second descriptor based on the image data received from the terminal device 10*a*, or may request crowdsourcing of image data about the area.

As shown in FIG. 4, when an area where the difference between the first descriptor and the second descriptor (difference between the image data and the VPS map) is greater than or equal to the predetermined value (e.g., 50%) and less than a predetermined reconstruction reference value (e.g., 65%) is identified, the server 20 may update a second key point and a second descriptor of the corresponding area based on query data of the image data itself received for location determination of the terminal device 10*a*, thereby may update the VPS map (supplement).

Also, as shown in FIG. 4, when an area where the difference between the first descriptor and the second descriptor is greater than or equal to the predetermined reconstruction reference value is identified, the server 20 may request crowdsourcing of image data about the area, and update a second key point and a second descriptor of the corresponding area based on image data of the area received in response to the request for crowdsourcing, thereby may update the VPS map (reconstruction).

That is, when the image data is different from the VPS map but the difference is insignificant (e.g., a size of sign is partially changed or displayed goods are changed, etc.), the server 20 may supplement the VPS map by updating the key point and the descriptor by use of the image data itself received from the terminal device 10*a* for the location determination. When the difference between the image data and the VPS map is significant (e.g., a store itself is changed, etc.), the server 20 may request crowdsourcing to request image data about the corresponding area.

In FIG. 3, it is referred to as an example that the difference between the first descriptor and the second descriptor is greater than the predetermined reconstruction reference value.

According to an exemplary embodiment of the present disclosure, the server 20 may request crowdsourcing of the image data about the determined area (350). That is, when an area where the difference between the image data and the VPS map is significant is identified, the server 20 may request crowdsourcing to obtain image data about the corresponding area. In the instant case, the server 20 may upload a request for crowdsourcing to a service providing application, thereby may transmit the request for crowdsourcing to a user terminal that has subscribed the service.

In the present instance, according to various exemplary embodiments of the present disclosure, when the difference between the first descriptor and the second descriptor is greater than or equal to the predetermined reconstruction reference value, the server 20 may control the user interface 220 to guide a necessity for reconstruction of the VPS map for the area, and request crowdsourcing for the area based on a user input.

In the present instance, when a plurality of areas where the difference between the first descriptor and the second descriptor is greater than or equal to the predetermined reconstruction reference value exist, the server 20 may control the user interface 220 to display a list of the plurality of areas in an order of greatest difference between the first descriptor and the second descriptor, and request crowdsourcing for an area selected by a user.

For example, as shown in FIG. 5, when crowdsourcing information about an area that requires crowdsourcing is input, the server 20 may request crowdsourcing for the corresponding area. Here, the crowdsourcing information includes at least one of a name, location or reward information of the area. In the present instance, the user interface 200 may display an interface 510 where the crowdsourcing information is to be input, and a location 525 of the area on a planar map 520 corresponding to the VPS map.

Furthermore, when at least one of generation, correction, or deletion of information about an area is input, the server 20 may request crowdsourcing for the corresponding area. As shown in FIG. 6, the server 20 may control the user interface 220 to display information about an area located within a predetermined distance based on the location of the terminal device 10a. In the instant case, the user interface 220 may display information 610 about a specific area (e.g., an address, a phone number, business hours, a location 625 of the area on a planar map 620 corresponding to the VPS map), based on a user's selection on the specific area. Also, the user interface 220 may provide a correction interface 630 for correcting the information 610 about the specific area, a deletion interface 640 for deleting the information 610 about the specific area, and a generation interface 650 for generating the information 610 about a new area. Furthermore, when at least one of the generation, correction or deletion of information about an area is input through the interfaces 630, 640 and 650, the server 20 may request crowdsourcing for the corresponding area.

A user terminal 10b illustrated in FIG. 3 may be included in the terminal device 10 described above, and correspond to a terminal (e.g., a smartphone) of a user that participated in crowdsourcing in response to the request for crowdsourcing.

The user terminal 10b according to various exemplary embodiments of the present disclosure may transmit image data about the determined area in response to the request for crowdsourcing (360).

A request signal for requesting crowdsourcing may include at least one of location information of area, photographing guide information for obtaining image data, or AR icon information for location guidance of area.

Through the above, the user terminal 10b that receives the request signal for requesting crowdsourcing may identify a location of an area that requires crowdsourcing of image data, and also display a guide to photographing for obtaining the image data or a route guidance to the corresponding area using an AR icon.

Figure 7A:
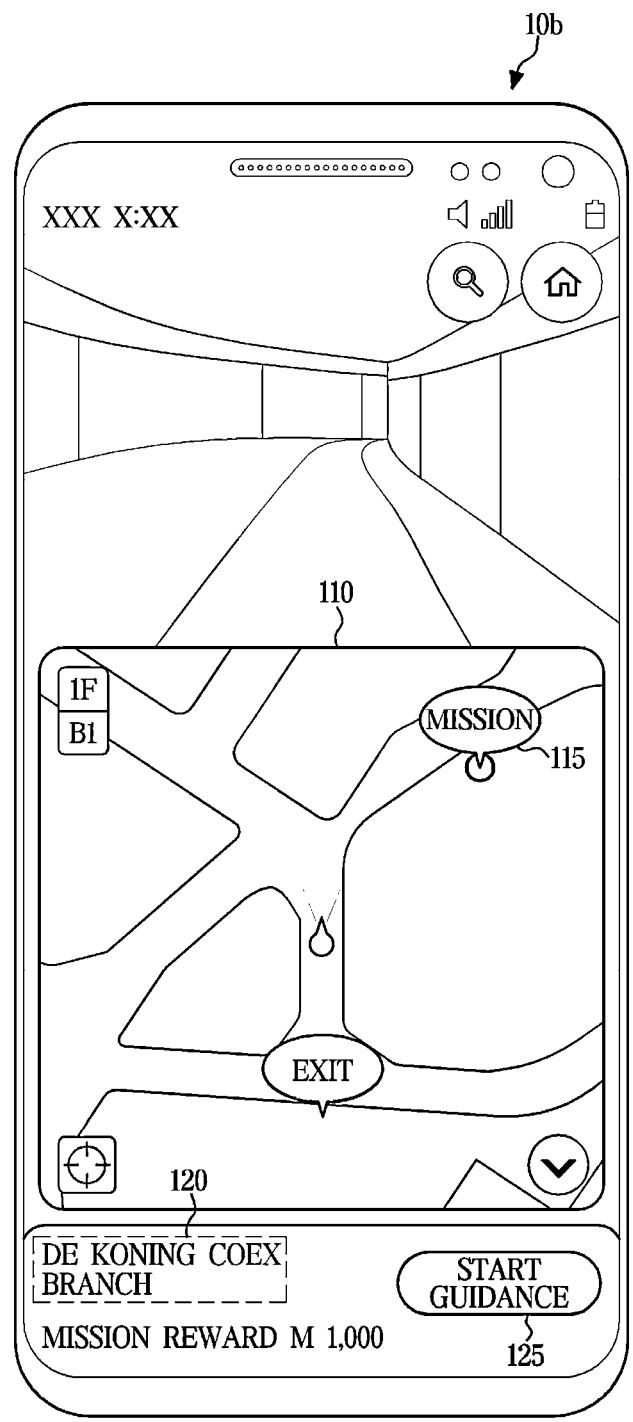
FIG. 7A, FIG. 7B, FIG. 7C and FIG. 7D illustrate examples where a terminal device participates in crowdsourcing according to an exemplary embodiment of the present disclosure.

For example, the user terminal 10b may display location information about an area where crowdsourcing is requested, while performing an AR route guidance based on the VPS map. For instance, as shown in FIG. 7A, the user terminal 10b may display a location 115 of an area where crowdsourcing is requested on a planar map 110 corresponding to the VPS map, and also display a name 120 of the area where crowdsourcing is requested and an interface 125 for starting guidance.

Figure 7B:
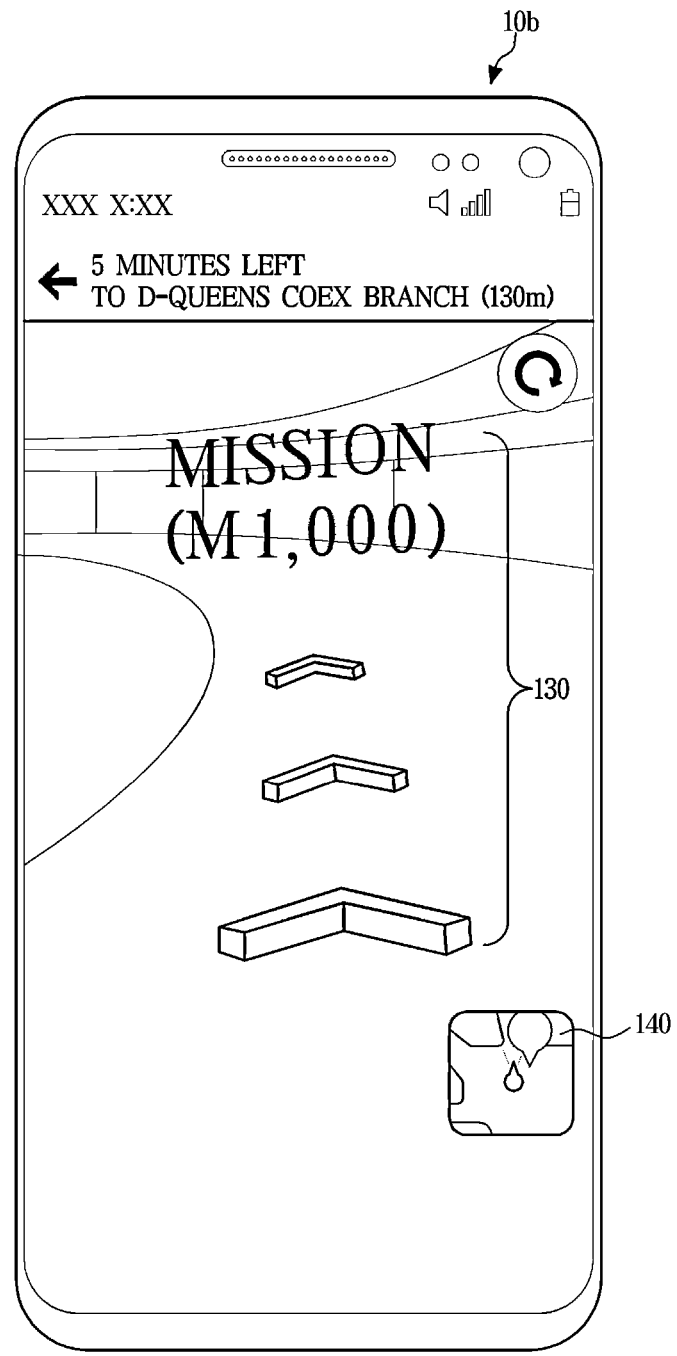

Also, as shown in FIG. 7B, the user terminal 10b may display an AR icon 130 for guiding a route to an area where crowdsourcing is requested, by superimposing the AR icon 130 on an image photographed through a camera, and also display a mini map 140 to guide the area where crowdsourcing is requested.

Figure 7C:
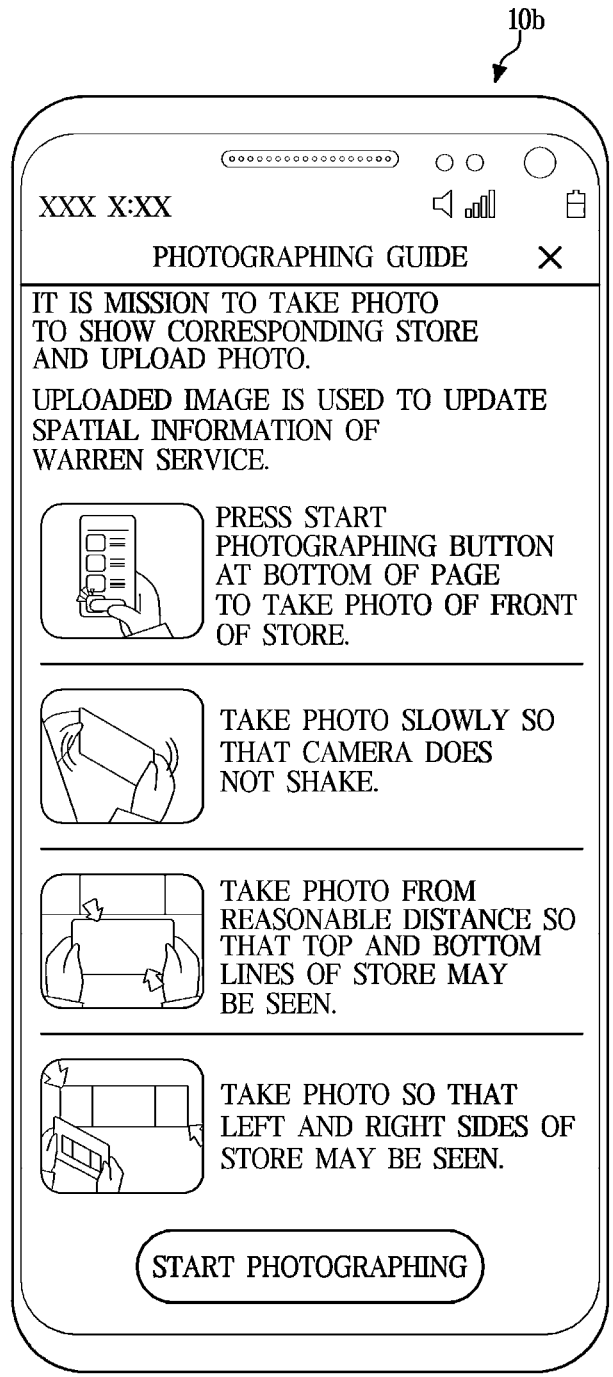

Furthermore, as shown in FIG. 7C, when reaching the area where crowdsourcing is requested, the user terminal 10b may display photographing guide information 150 obtaining image data required for crowdsourcing.

Figure 7D:
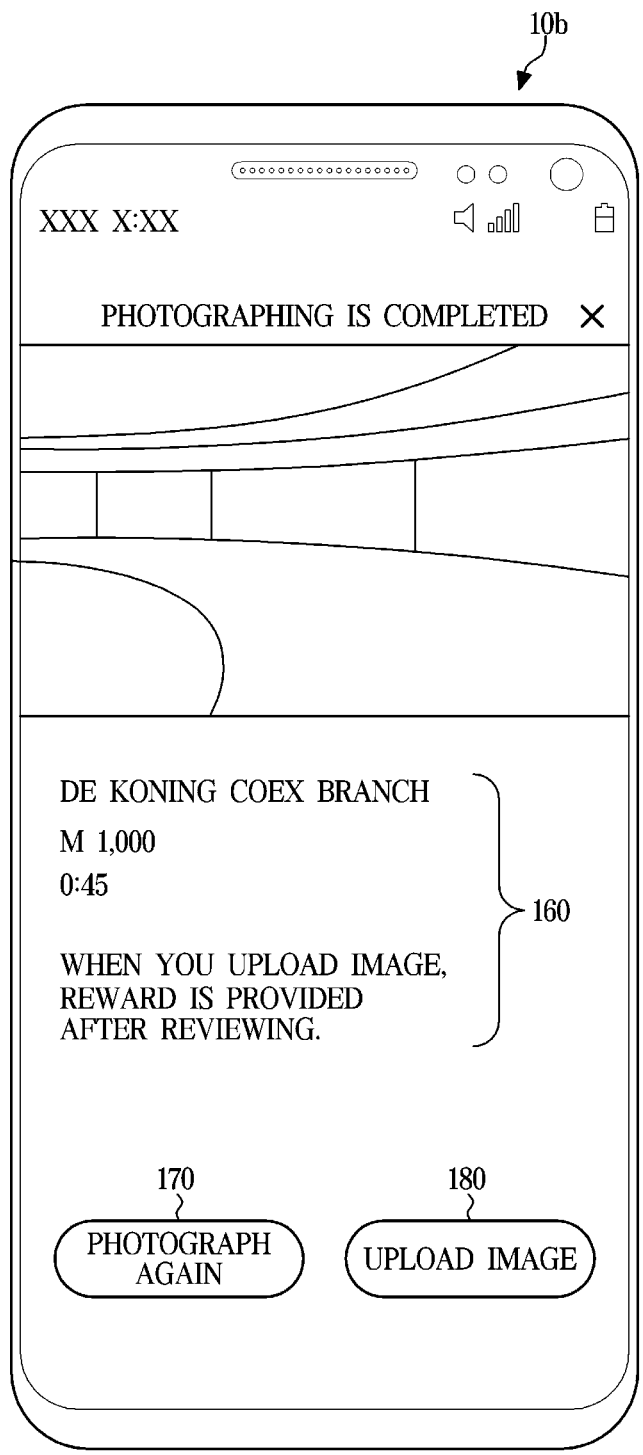

Furthermore, as shown in FIG. 7D, when the image data about the area where crowdsourcing is requested is obtained, the user terminal 10b may display a reward history 160, an interface 170 for photographing again, and an interface 180 for uploading. Also, based on a user input on the interface 180 for uploading, the user terminal 10b may transmit the image data about the area to the server 20.

According to an exemplary embodiment of the present disclosure, the server 20 may update the second key point of the determined area on the VPS map and the second descriptor, based on the image data about the determined area (370), and provide a reward to the user terminal 10b that participated in crowdsourcing (380).

As described above, when an area where a matching rate between the first descriptor based on the image data for location determination of the terminal device 10a, and the second descriptor, stored in the VPS map, is less than or equal to a predetermined value exists, which is determined by the server 20 as a change in geographical feature in the corresponding area. Also, the server 20 obtains image data about the corresponding area through crowdsourcing. Accordingly, a cost and time for managing and correcting the VPS map may be minimized.

Figure 8:
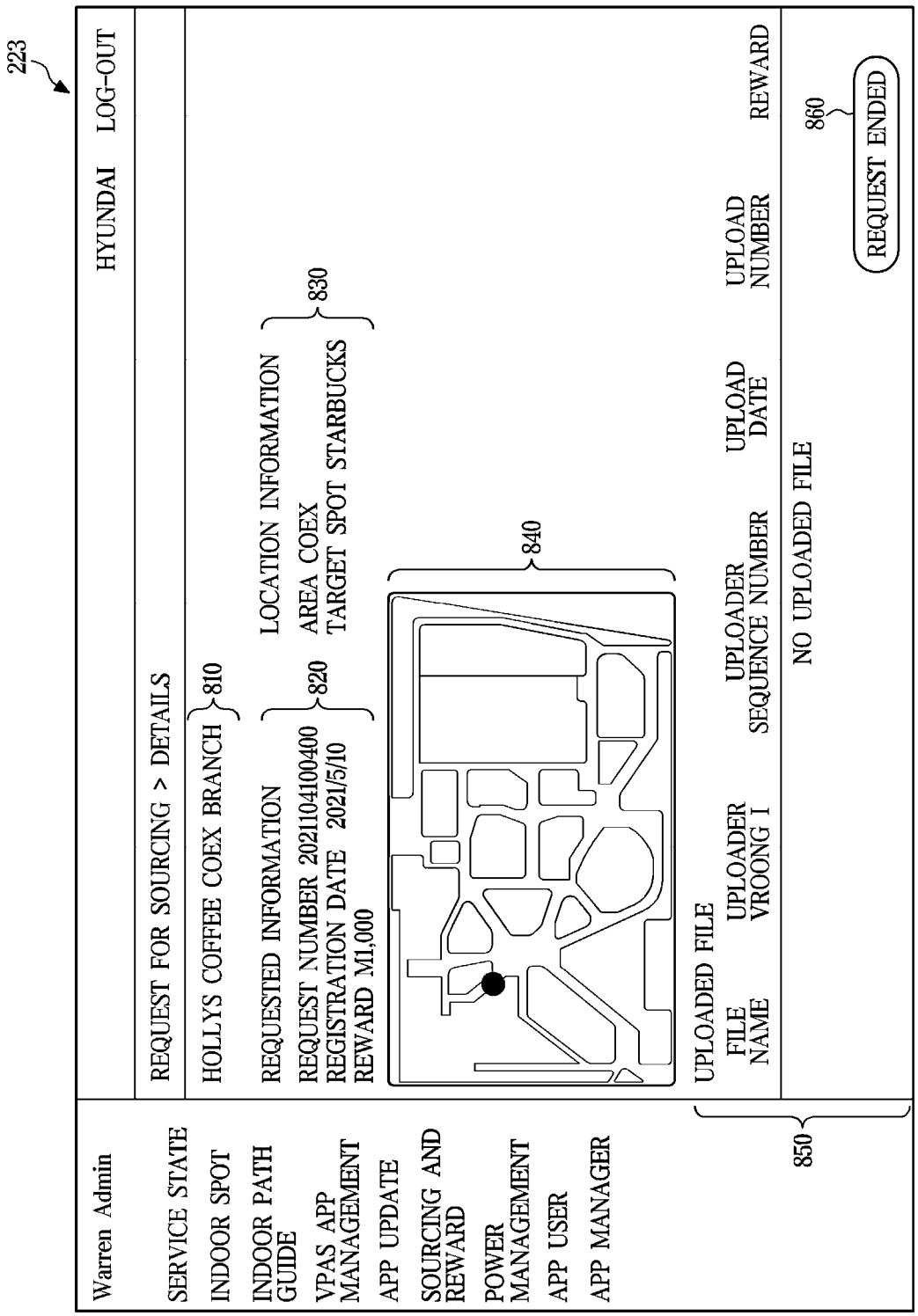
FIG. 8 illustrates an example a server displays detailed information about a request for crowdsourcing according to an exemplary embodiment of the present disclosure.

FIG. 8 illustrates an example a server displays detailed information about a request for crowdsourcing according to an exemplary embodiment of the present disclosure. FIG. 9 illustrates an example a server displays a crowdsourcing request list according to an exemplary embodiment of the present disclosure.

Referring to FIG. 8, according to an exemplary embodiment of the present disclosure, the server 20 may control the user interface 220 to display crowdsourcing information about an area. For example, the crowdsourcing information may include a name 810 of an area where crowdsourcing is requested, request information 820 (request number, registration date, reward), location information 830, a location on a planar map 840, and information 850 about uploaded image data.

Also, the server 20 may control the user interface 220 to display an end interface 860 for receiving an end command of crowdsourcing. When the end command of crowdsourcing is input, the server 20 may end portion requesting crowdsourcing for the corresponding area.

Referring to FIG. 9, according to an exemplary embodiment of the present disclosure, the server 20 may control the user interface 220 to display crowdsourcing state information about each of areas where crowdsourcing is requested, as a list 910. Here, the crowdsourcing state information includes at least one of whether image data is uploaded or a degree of update progress.

Furthermore, the server 20 may display interfaces 920 and 940 which may search for a specific area on the list 910, interfaces 930 and 940 which may search for an area in a specific progress state, and an interface 950 for generating new crowdsourcing.

Hereinafter, embodiments of a method of controlling the server 20 according to an aspect of the present disclosure is described. The server 20 described above may be used for the method of controlling the server 20. Accordingly, a description made with reference to FIG. 1, FIG. 2, FIG. 3, FIG. 4, FIG. 5, FIG. 6, FIG. 7A, FIG. 7B, FIG. 7C and FIG. 7D, FIG. 8 and FIG. 9 is equally applicable to the method of controlling the server 20.

Figure 10:
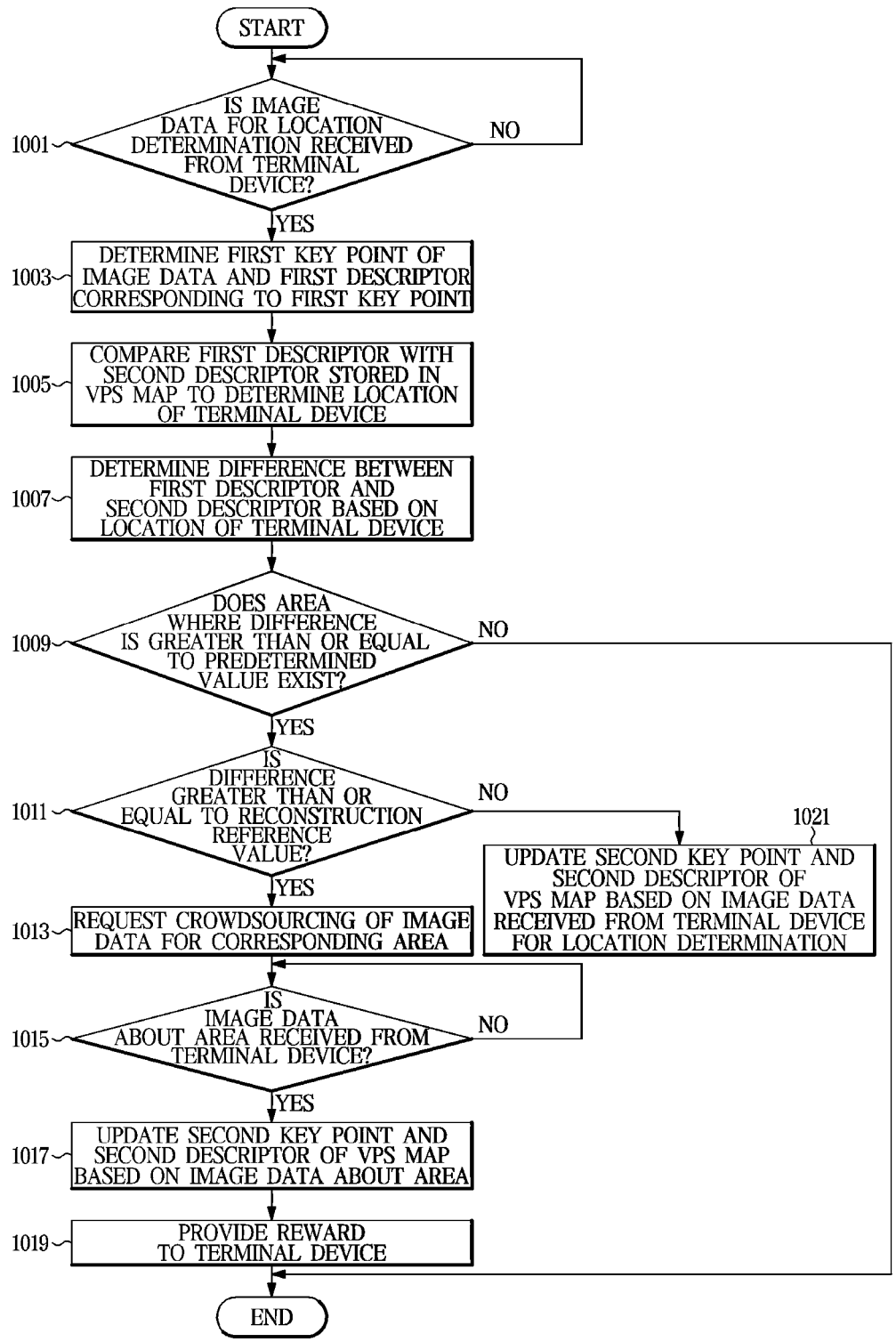
FIG. 10 is a flowchart illustrating operations of updating a key point of an area and a descriptor, in a method of controlling a server according to an exemplary embodiment of the present disclosure.

FIG. 10 is a flowchart illustrating operations of updating a key point of an area and a descriptor, in a method of controlling the server 20 according to an exemplary embodiment of the present disclosure.

Referring to FIG. 10, according to an exemplary embodiment of the present disclosure, when receiving image data for location determination from the terminal device 10 (Yes in operation 1001), the server 20 may determine a first key point of the image data and a first descriptor corresponding to the first key point (1003).

That is, the server 20 may extract the first key point through image processing of the image data and determine the first descriptor corresponding to the first key point. In the present instance, the key point may refer to a point which may specify a shape of an object, such as an edge portion of the object.

Also, the descriptor may correspond to a data structure for recording a property of key point of image data, and describe information about a key point in a vector form by including an angle, a pose, and the like, of the key point. Accordingly, a descriptor corresponding to a single key point may indicate a unique characteristic of the key point, and a corresponding key point may be identified through matching of descriptor. To the present end, the descriptor may have an ability to distinguish key points different from each other, and invariance which is not changed by rotation reduction, or transformation of image data. For example, the descriptor may be a scale invariant feature transform (SIFT), histogram of oriented gradient (HOG), and a binary descriptor (BRIEF, ORB, BRISK), without being limited thereto. That is, a descriptor may be applied without limitation, as long as it is a known type of descriptor.

According to an exemplary embodiment of the present disclosure, the server 20 may compare the first descriptor with a second descriptor stored in the VPS map, thereby may determine a location of the terminal device 10 (1005). The server 20 may identify the second descriptor that matches the first descriptor, and determine the location of the terminal device 10 based on a location of a key point on the VPS map corresponding to the second descriptor.

According to an exemplary embodiment of the present disclosure, the server 20 may determine a difference between the first descriptor and the second descriptor based on the location of the terminal device 10 (1007).

According to an exemplary embodiment of the present disclosure, when an area where the difference is greater than or equal to a predetermined value (Yes in operation 1009) and is greater than or equal to a reconstruction reference value (Yes in operation 1011), the server 20 may request crowdsourcing of image data for the corresponding area (1013).

That is, by comparing the descriptors, the server 20 may determine the area different from the image data received from the terminal device 10 on the previously stored VPS map.

Furthermore, when receiving the image data for the area from the terminal device 10 (Yes in operation 1015), the server 20 may update a second key point and the second descriptor of the VPS map based on the image data about the area (1017), and provide a reward to the terminal device (1019).

That is, when an area where the difference between the first descriptor and the second descriptor is greater than or equal to a predetermined reconstruction reference value is identified, the server 20 may request crowdsourcing of image data about the area, and update a second key point and second descriptor of the corresponding area based on image data of the area received in response to the request for crowdsourcing, thereby may update the VPS map (reconstruction).

Furthermore, when the difference is less than the predetermined reconstruction reference value (No in operation 1011), the server 20 may update the second key point and the second descriptor of the VPS map based on the image data received from the terminal device 10 for location determination (1021).

When an area where the difference between the first descriptor and the second descriptor (difference between the image data and the VPS map) is greater than or equal to the predetermined value (e.g., 50%) and less than the predetermined reconstruction reference value (e.g., 65%) is identified, the server 20 may update a second key point and second descriptor of the corresponding area based on query data of the image data itself received for location determination of the terminal device 10, thereby may update the VPS map (supplement).

As is apparent from the above, according to the exemplary embodiments of the present disclosure, the server and the control method thereof can update a VPS map through crowdsourcing, thereby can reduce a cost for managing and correcting the VPS map and improve an accuracy of the VPS map.

Embodiments can thus be implemented through computer readable code/instructions in/on a medium, e.g., a computer readable medium, to control at least one processing element to implement any above described exemplary embodiment of the present disclosure. The medium can correspond to any medium/media permitting the storing and/or transmission of the computer readable code.

The computer-readable code may be recorded on a medium or transmitted through the Internet. The medium may include read only memory (ROM), random access memory (RAM), magnetic tapes, magnetic disks, flash memories, and optical recording medium.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A server, comprising:
    a communicator; and
    a controller configured to:
        when first image data is received from a terminal device through the communicator, determine a first key point of the first image data and a first descriptor corresponding to the first key point,
        determine a location of the terminal device by comparing the first descriptor with a second descriptor stored in a virtual positioning system (VPS) map,
        identify an area where a difference between the first descriptor and the second descriptor is greater than or equal to a predetermined value based on the location of the terminal device,
        in response to the identified area where the difference between the first descriptor and the second descriptor is not greater than or equal to a predetermined reconstruction reference value, update the second descriptor based on the first image data,
        in response to the identified area where the difference between the first descriptor and the second descriptor is greater than or equal to the predetermined reconstruction reference value, request crowdsourcing of second image data of the area to the terminal device,
        after the second image data of the area is received from the terminal device, update a key point of the area on the VPS map and the second descriptor based on the second image data of the area, and
        when a plurality of areas are identified where the difference between the first descriptor and the second descriptor is greater than or equal to the predetermined reconstruction reference value, control a user interface to display a list of the plurality of areas in an order of greatest difference between the first descriptor and the second descriptor.

2. The server of claim 1, wherein the controller is configured to provide a reward to the terminal device that transmits the second image data of the area.

3. The server of claim 1, wherein a request signal for requesting the crowdsourcing includes at least one of a location information of the area, a photographing guide information for obtaining the second image data, or an augmented reality (AR) icon information for guiding a location of the area.

4. The server of claim 1, further comprising:
    the user interface including a display module and an input module.

5. The server of claim 4, wherein, when the area where the difference between the first descriptor and the second descriptor is greater than or equal to the predetermined reconstruction reference value is identified, the controller is configured to control the user interface to guide a necessity for reconstruction of the VPS map for the area, and request crowdsourcing for the area based on a user input.

6. The server of claim 5, wherein, when a crowdsourcing information of an area that requires crowdsourcing is input, the controller is configured to request crowdsourcing for the area that requires the crowdsourcing, the crowdsourcing information comprising at least one of a name, a location or a reward information of the area that requires the crowdsourcing.

7. The server of claim 6, wherein the controller is configured to control the user interface to display the crowdsourcing information of the area that requires the crowdsourcing.

8. The server of claim 4, wherein the controller is configured to control the user interface to display information of an area located within a predetermined distance based on the location of the terminal device.

9. The server of claim 8, wherein, when at least one of generation, correction, or deletion of information of an area is input, the controller is configured to request crowdsourcing for the area of which the at least one of the generation, the correction, or the deletion of information is input.

10. The server of claim 4, wherein the controller is configured to control the user interface to display a crowdsourcing state information about each of areas where crowdsourcing is requested, as a list, the crowdsourcing state information comprising information of at least one of whether the second image data is uploaded or a degree of update progress.

11. The server of claim 4, wherein the controller is configured to stop requesting crowdsourcing for the area, when an end command for crowdsourcing is received.

12. The server of claim 1, wherein the controller is configured to control the communicator to transmit a message that confirms the update of the key point of the area and the second descriptor, to the terminal device that transmits the second image data of the area.

13. A method of controlling a server comprising a communicator and a controller, the control method comprising:
    when first image data is received from a terminal device through the communicator, determining, by the controller, a first key point of the first image data and a first descriptor corresponding to the first key point;
    determining, by the controller, a location of the terminal device by comparing the first descriptor with a second descriptor stored in a virtual positioning system (VPS) map;
    identifying, by the controller, an area where a difference between the first descriptor and the second descriptor is greater than or equal to a predetermined value based on the location of the terminal device;
    in response to an identified area where the difference between the first descriptor and the second descriptor is not greater than or equal to a predetermined reconstruction reference value, update the second descriptor based on the first image data;
    in response to the identified area where the difference between the first descriptor and the second descriptor is greater than or equal to the predetermined reconstruction reference value, request crowdsourcing of second image data of the area to the terminal device;
    after the second image data of the area is received from the terminal device, update a key point of the area on the VPS map and the second descriptor based on the second image data of the area; and
    when a plurality of areas are identified where the difference between the first descriptor and the second descriptor is greater than or equal to the predetermined reconstruction reference value, controlling, by the controller, a user interface to display a list of the plurality of areas in an order of greatest difference between the first descriptor and the second descriptor.

14. The method of controlling claim 13, further comprising:
  providing, by the controller, a reward to the terminal device that transmits the second image data of the area.

15. The method of controlling claim 13, wherein a request signal for requesting the crowdsourcing comprises at least one of a location information of the area, a photographing guide information for obtaining the second image data, or an augmented reality (AR) icon information for guiding a location of the area.

16. The method of controlling claim 13, wherein the server further comprises the user interface comprising a display module and an input module.

17. The method of controlling claim 13, further comprising:
  controlling, by the controller, the communicator to transmit a message that confirms the update of the key point of the area and the second descriptor, to the terminal device that transmits the second image data of the area.

* * * * *